United States Patent
Basnett et al.

(10) Patent No.: US 8,963,893 B2
(45) Date of Patent: Feb. 24, 2015

(54) CRT LIGHT PEN INTERFACE FOR FLAT PANEL DISPLAYS

(75) Inventors: Robert Joseph Basnett, Leander, TX (US); Mitchell Allen Gregory, Round Rock, TX (US); Stephen Lee Cowell, Round Rock, TX (US)

(73) Assignee: Plasmability, LLC, Austin, TX (US)

( * ) Notice: Subject to any disclaimer, the term of this patent is extended or adjusted under 35 U.S.C. 154(b) by 407 days.

(21) Appl. No.: 13/572,380

(22) Filed: Aug. 10, 2012

(65) Prior Publication Data

US 2013/0044083 A1 Feb. 21, 2013

Related U.S. Application Data

(60) Provisional application No. 61/644,320, filed on May 8, 2012, provisional application No. 61/612,653, filed on Mar. 19, 2012, provisional application No. 61/524,174, filed on Aug. 16, 2011.

(51) Int. Cl.
*G06F 3/037* (2013.01)
*G06F 3/045* (2006.01)
*G06F 3/042* (2006.01)
*G06F 3/033* (2013.01)
*G06F 1/32* (2006.01)
(Continued)

(52) U.S. Cl.
CPC .............. *G06F 1/325* (2013.01); *G06F 3/0386* (2013.01); *G06F 3/0416* (2013.01); *G06F 3/03542* (2013.01)
USPC ......... 345/180; 345/174; 345/175; 178/19.05

(58) Field of Classification Search
CPC ................................. G06F 3/033; G06F 3/037
USPC ..................... 345/173–184; 179/19.05–19.07
See application file for complete search history.

(56) References Cited

U.S. PATENT DOCUMENTS

| 4,688,933 A | 8/1987 | Lapeyre |
| 5,877,752 A | 3/1999 | Puthuff et al. |

(Continued)

OTHER PUBLICATIONS

"Notification of Transmittal of the International Search Report and the Written Opinion of the International Searching Authority, or the Declaration" For PCT/US2012/050458, Jan. 2, 2013, 10 pages, Korean Intellectual Property Office, Daejeon, Republic of Korea.

(Continued)

*Primary Examiner* — Lun-Yi Lao
*Assistant Examiner* — Jarurat Suteerawongsa
(74) *Attorney, Agent, or Firm* — Kurt Rauschenbach; Rauschenbach Patent Law Group, LLC

(57) ABSTRACT

A CRT light pen emulating interface with power save and remote access for flat panel displays includes a pen flat panel display that indicates at least one of a user action with a light pen switch or other device and a presence of a light pen emulating object positioned on or proximate to a display surface of the electromagnetic pen flat panel display. A light pen emulating object is positioned proximate to the electromagnetic pen flat panel display. A processor generates a light pen emulation signal comprising position data for the light pen emulating object relative to the display surface of the electromagnetic flat panel display. A light pen CRT electronic interface converts the position data for the light pen emulating object into a corresponding signal that is comparable to a signal generated by a CRT light pen viewing a scanning dot on the CRT screen.

41 Claims, 6 Drawing Sheets

(51) Int. Cl.
*G06F 3/038* (2013.01)
*G06F 3/041* (2006.01)
*G06F 3/0354* (2013.01)

(56) References Cited

U.S. PATENT DOCUMENTS

| | | |
|---|---|---|
| 7,421,111 B2 | 9/2008 | Dietz et al. |
| 2005/0099405 A1* | 5/2005 | Dietz et al. ............... 345/179 |
| 2008/0291179 A1* | 11/2008 | Willemsen et al. ......... 345/180 |

OTHER PUBLICATIONS

"Notification Concerning Transmittal of International Preliminary Report on Patentability (Chapter I of the Patent Cooperation Treaty)" for PCT/US2012/050458, Feb. 27, 2014, 7 pages, The International Bureau of WIPO, Geneva Switzerland.

www.Arrows Eng. Co., Ltd. [Semiconductor Items Plan, Production, Remodel, Repair, Sale Semiconductor Items Construction].

* cited by examiner

300

| Power saver circuit logic table |||||
|---|---|---|---|---|
| VGA Video Card ||| Output to monitor ||
| Red | Green | Blue | H Sync | V Sync |
| 0 Volts | 0 Volts | 0 Volts | ON | OFF |
| Voltage > 0 on any line ||| ON | ON |

| Display Power Management Signaling on monitor |||
|---|---|---|
| V Sync | H Sync | Monitor state |
| ON | ON | ON |
| OFF | OFF | Stand By |
| OFF | OFF | Suspend |
| OFF | OFF | OFF |

FIG. 3B

CRT LIGHT PEN INTERFACE FOR FLAT PANEL DISPLAYS

CROSS REFERENCE TO RELATED APPLICATIONS

This patent application is a non-provisional of U.S. Provisional Patent Application Ser. No. 61/524,174 filed Aug. 16, 2011, entitled "CRT Light Pen Interface for Flat Panel Displays." This patent application is also a non-provisional of U.S. Provisional Patent Application Ser. No. 61/612,653, filed Mar. 19, 2012, entitled "Light Pen Monitor Interface Power Saver Circuit." This patent application is also a non-provisional of U.S. Provisional Patent Application Ser. No. 61/644,320 filed May 8, 2012, entitled "CRT Light Pen Interface for Flat Panel Displays with Remote Access." The entire disclosures of these provisional patent applications are incorporated herein by reference.

The section headings used herein are for organizational purposes only and should not to be construed as limiting the subject matter described in the present application in any way.

INTRODUCTION

Light pens have been used for many years with cathode-ray-tube (CRT) displays to input data. This type of user interface system provides a means for users to enter information into a computer, without requiring the use of a mouse, keyboard or other data-entry device. These user interfaces have a number of advantages, particularly for systems located in clean room environments where simplicity and cleanliness are essential. For example, many semiconductor manufacturing equipment suppliers commonly being placed such user interfaces and continue to use them today for some products. Applied Materials, Inc. is one example of a supplier that manufactures equipment with such user interfaces In fact, many thousands of industrial systems currently use CRT light pen interfaces and these interfaces operate in factories worldwide. However, most CRTs that are currently deployed are at or near their useful life expectancy. Since CRT manufacturing is now very limited because of very low demand, many of these industrial systems with CRT light pen interfaces present serviceability problems for users. The market place has responded with alternative user interfaces, such as specialized touch-screen displays. However, these alternative user interfaces typically have significant limitations including cost, reliability, and lack of backward-compatibility with the existing installed base of equipment.

More modern equipment includes a variety of different types of user interfaces that provide satisfactory solutions. However the newer interface technologies typically cannot be used with the older CRT light-pen systems, without the addition of expensive retrofit of electronics. Many companies cannot afford such retrofit electronics. For example, most modern semiconductor processing equipment includes flat panel displays, such as liquid crystal device (LCD) and light emitting diode (LED) or organic light emitting diode (OLED) displays. Known CRT light pen interfaces are not suitable for use with flat panel LCD and LED displays. More traditional computer mice and tracking pads or similar devices can be used with flat panel LCD or LED displays. However, these have devices have a different feel than the CRT light pen and thus, are less desirable in applications where a CRT light pen has been in prior use.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The person skilled in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

FIG. 3A illustrates a power saver circuit logic table.

FIG. 3B illustrates a display power management signaling table.

DESCRIPTION OF VARIOUS EMBODIMENTS

Figure 1:
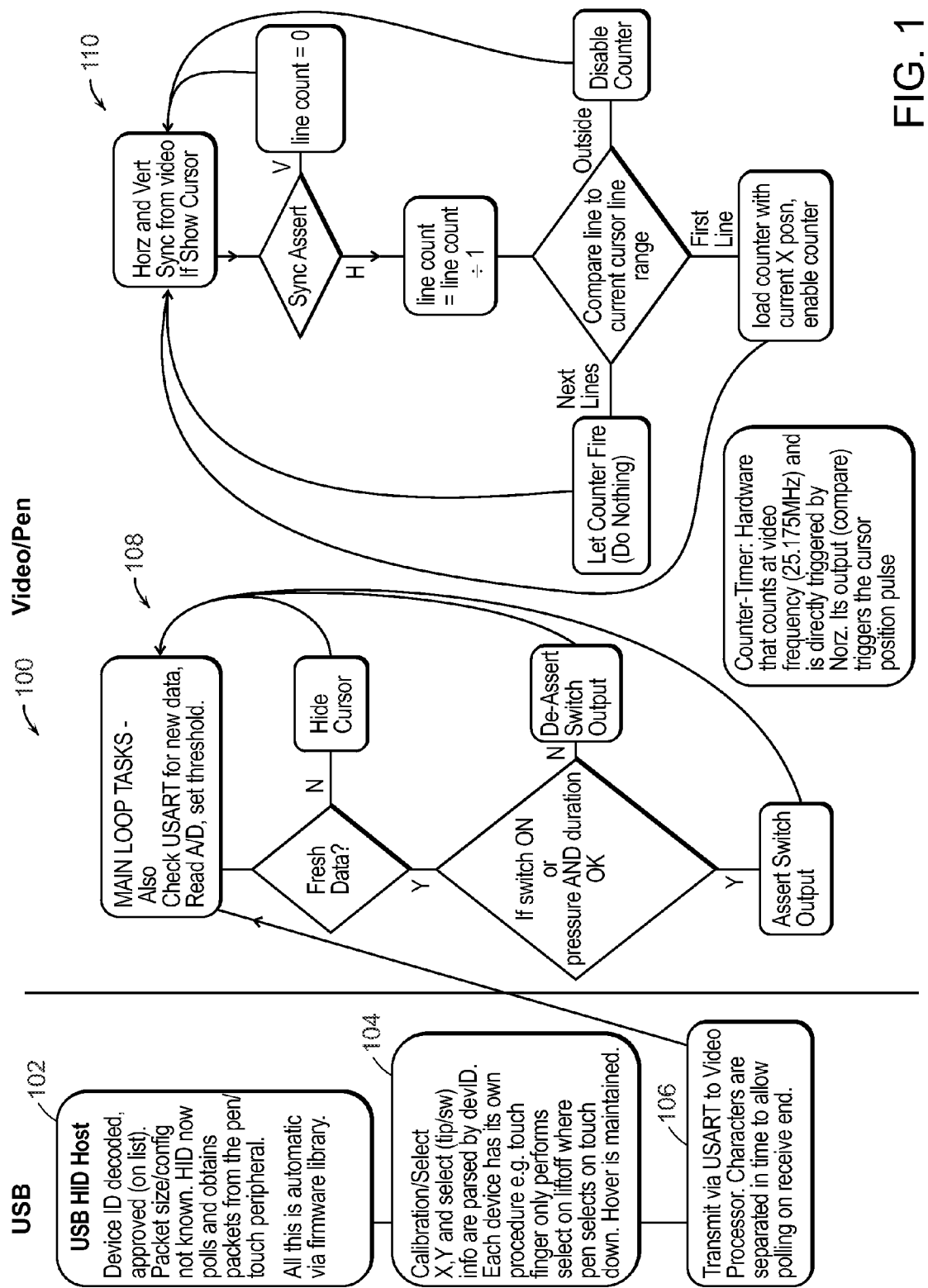
FIG. 1 illustrates a flow chart of a method of inputting user data into a flat panel display using a CRT light-pen emulation system according to the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching may be performed in any order and/or simultaneously as long as the teaching remains operable. Furthermore, it should be understood that the apparatus and methods of the present teaching can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching relates to an electronic interface including hardware and software that enables flat-panel display technology, such as LCD, LED and plasma displays to emulate a legacy CRT light pen user interface system. The light pen emulation system provides all of the functionality of the widely deployed CRT light-pen systems, without requiring costly modification to the host computer system. In addition, the light pen emulation system can provide remote access of the light pen emulation system via a local network or the Internet.

More specifically, in one embodiment, the CRT light pen interface according to the present teaching interfaces known widely deployed CRT light-pen systems to LCD, LED, and plasma flat panel displays. Known CRT light pen systems will not work with LCD, LED, and plasma displays because these displays do not generate a scanning dot for the light pen system to track. However, some LCD, LED, and plasma displays have detection capabilities beyond the surface of the display enclosure. For example, known touch screen LCD displays require that the display enclosure be physically touched by an object that is either a good conductor or that has a high capacitance. Examples of such objects include a bare finger or a conductive elastomer pointing object. Bare fingers are not desirable and, in fact, not allowed in many clean room and other manufacturing environments. Using a gloved finger is often not practical. Gloves typically degrade the signal and the resolution of the device. Conductive elastomer pointers are also not practical in many environments because they have a limited lifetime and often cannot be used because they are a source of particulate matter due to shedding and other degradation of the pointer.

Some LCD displays are able to detect specific objects a considerable distance from the display enclosure. For example, distances as close as 0.1 mm and as far away as several centimeters can be detected by some LCD display. One such LCD display is a model number DTF720 electromagnetic (EM) pen LCD display manufactured by Wacom Technology Company, Vancouver, Wash., which is a wholly owned subsidiary of Wacom Company, Ltd., Tokyo, Japan. This particular display uses an electromagnetic field to sense the presence of a pointer when it is within range of the display. Another such LCD display is model number 3019HA03 manufactured by Hanwang Technology Co., Ltd., Beijing, China. One skilled in the art will appreciate that other z-axis sensing displays, such as capacitive, electrostatic, infrared, and surface acoustic wave sensing displays can be used with the CRT light pen emulating interfaces of the present teaching.

When a light pen emulating object is brought within the detection range of an EM pen LCD display, its presence is indicated to the LCD electronics through either a user action or by detection of the light pen emulating object itself In various embodiments, the light pens can be active (powered) or passive (unpowered). An example of a typical user action is activating a switch. The EM pen LCD display electronics records the presence of the light pen emulating object at a specific display location. This specific display location is then translated into a light-pen emulation signal. The light pen emulation signal is then transmitted to the existing light-pen CRT electronics interface.

In some systems according to the present teaching, an electromagnetic pen LCD display provides a light-pen emulation signal through a standard digital interface, such as USB Human Interface Device (HID). The light-pen emulation signal indicates where the pointing device was aimed at on the display screen. The electronic interface in the CRT light pen emulation system converts the pointing information in the light-pen emulation signal into a signal that is comparable to a signal that would be produced by a CRT light pen viewing a scanning dot on the CRT screen. The term "a signal that is comparable to" as used herein means that the signal has substantially the same effect. The signal provided by the CRT light pen emulation electronics is then transmitted to a video interface that is part of a larger system, such as a semiconductor manufacturing system. The video interface will then process the information as if it had come from a CRT light pen system. Such CRT light pen interfaces for LCD and LED displays are relatively inexpensive and work well with many manufacturing and other types of systems.

The CRT light pen emulating interfaces for LCD and LED displays according to the present teaching includes a video processor that generates cursor "blip." In addition, the video processor processes information from the pointer and its switch. Any position type HID device can be used with the light pen interface of the present teaching. For example, Wacom manufactures such position-type HID devices. Any HID-capable touch screen device can also be used. In addition, there are numerous generic HID mice and trackballs that can be used with the light pen interface of the present teaching. Any one of numerous kinds of position type devices that include a cursor can be used.

FIG. 1 illustrates a flow chart of a method 100 of inputting user data into a flat panel display using a CRT light-pen system according to the present teaching. A first step 102 includes generating position and switch data packets with the human interface device. In one embodiment, position and switch data packets are generated in a head-sync style for serial transmission.

A second step 104 includes parsing information provided by the human interface device. For example, the second step 104 can include parsing information to obtain position and switch data for a light pen, where the switch data could come, for example, from depressing a switch or by the detection of pressure on the light pen tip. Position and switch data can be represented as X, Y, and Z data, where X and Y are coordinates in the display plane and Z is the switch derived from the detection of pressure applied to the display with the light pen or from the detection of the pen tip positioned proximate to the display.

The second step 104 also includes calibrating the information provided by the human interface device, such as the position and switch information, with predetermined calibration standards. The calibration in the second step 104 can include scaling and bounding the position and switch data.

The third step 106 is to transmit the information provided by the human interface device to a video processor. For example, in one method according to the present teaching, data packets are spaced apart and each packet contains packet data, such as position and switch data. In some methods, data packets are parsed twice, once from HID, and then during video processing. The transmission can be done through a universal synchronous/asynchronous receiver/transmitter (USART). The steps can be performed at the normal clock rate for a USB type human interface device.

The fourth step 108 includes receiving the position and switch data transmitted through the serial link to a video processor. In one embodiment according to the present teaching, the position and switch data is received through a USART. Polling can be used to reduce, minimize or eliminate the use of interrupts which will improve the synchronization response. In some embodiments, the receiving of the position and switch data is performed at the same clock speed used to transmit the information provided by the human interface device. In other embodiments, the receiving of the position and switch data is performed at a clock speed that is different from the clock speed used to transmit the information provided by the human interface device. For example, the clock speed can be the ideal counting frequency for the timer-counter to count at the desired pixel accuracy, which is 25.175 MHz for some systems. Using the ideal counting frequency reduces cursor instability. Spacing the secondary packets at the appropriate time intervals reduces interrupt loading.

Thus, one aspect of the present teaching is that the position and switch data transmission between the human interface device and the video processor can be performed in such a manner that no interrupts are necessary when the video processor receives and decodes the position and switch data. Consequently, transmit and receive signals can be synchronized exactly with no uncertainty due to non-process interrupts. For example, in the fourth step when the information provided by the human interface device is transmitted to a video processor, the position and switch data can be spaced out to fill the width between data packets. This allows the maximum use of time without any response penalty. The video processor then receives the characters via polling in the fourth step. The position and switch data are retrieved whenever the video processor is free to read the data.

The sixth step 110 is to parse the position and switch data. To display the cursor, the video side must watch both the horizontal (H) and vertical (V) sync signals from the VGA cable. Every vertical sync signal causes the line count to go to zero; every horizontal sync signal is counted until the desired cursor position range is reached. While the horizontal count is within the desired cursor range (3 lines are triggered in this example), a timer-counter is initialized with the current X position and enabled. When the following H signals arrive they automatically trigger the timedown of the counter, which automatically outputs the assertion of the cursor 'blip' output. An interrupt catches this assertion, and both de-asserts the output and prepares the counter for the next trigger. This causes the host computer to place the cursor at the desired location.

One aspect of the present teaching is a CRT light pen emulating interface that generates a "blip" pulse on the light pen input when the VGA scan is at the desired position on the display.

Another aspect of the present teaching is to provide a power save mode for the light pen emulating interface of the present teaching that conserves energy when the system is in an idle state. Many video systems that work with known CRT display and light pen systems are not configured to enter into an energy conserving state when the system is idle. However, most video monitors built after 1993 include electronics that implement Display Power Management Signaling (DPMS) which switches the monitor into a power saving mode. Display power management signaling was either not available or not implemented at the time that many industrial systems using CRT displays and light pen system were manufactured.

One reason why display power management signaling was not implemented in these industrial systems is that CRT displays require a warm-up period to bring the display to a useable operating state. During this warm-up period, erroneous inputs could be made to the control system from the light pen. Another reason is that in this earlier period of time, designers were not as concerned about power usage as they are today. Consequently, many system designers engineered their systems so that the CRT display was continuously active. One such CRT display and light pen control system is manufactured by Applied Materials, Inc. and used in semiconductor manufacturing systems built after 1985. These systems are numerous and widely used in semiconductor manufacturing facilities worldwide. The video controllers in these semiconductor manufacturing systems are part of a proprietary control system. Consequently, such video controllers are difficult to change or to modify because any changes to the control system may require re-qualification of the system. This makes replacement of the video system to accommodate display power management signaling cost prohibitive.

Many state-of-the-art systems use resistive or capacitive touch screens. Other state-of-the art systems use LCD displays with a mouse or trackball. Current replacement systems for CRT light pens using LCD monitors all enjoy an advantage of power savings, as compared to CRT display systems. However some of the video subsystems on the host computer have no way of implementing display power management signaling to place a monitor into power saving mode.

Semiconductor factories consume vast amounts of electrical power. Typical CRT displays consume about 90 W and typical LCD devices consume about 35 W. In contrast, a typical LCD display in sleep mode may consume as little as 0.5 W or less. An example of potential power savings using the light pen interface with power save circuit of the present teaching is as follows. The control system monitor used in many Applied Materials, Inc. semiconductor manufacturing systems is idle about 90% of the time. In these systems, using the power saver circuit of the present teaching will reduce energy by a factor of twelve compared with an LCD and by a factor of thirty-one compared with a CRT display system. It is estimated that over 20,000 Applied Materials, Inc. semiconductor manufacturing systems were built with the CRT and light pen control systems and that most of these systems are still in operation today. Applied Materials, Inc. semiconductor manufacturing systems typically contain two CRT displays that consume about 90 W each and that these systems operate twenty-four hours per day seven days a week with an estimated combined consumption of greater than 30 million kilowatt hours per year. It is highly desirable to implement a power saver circuit to reduce energy consumption in such CRT display systems.

Some details of the power saver circuit of the present teaching are described with an Applied Materials, Inc. CRT display and light pen control system. However, one skilled in the art will appreciate that the power saver circuit of present teaching can be used with any type of display and any type of light pen control system.

The power saver circuit of the present teaching emulates display power management signaling by monitoring the RGB signals generated by the control systems for video activity that indicates screen blanking For example, the Applied Materials, Inc. CRT display and light pen control system can initiate a screen saving feature to blank the display. However, during this condition, the RGB signals are output to display a black screen keeping the horizontal and vertical sync signals active. The power saving circuit of the present teaching monitors the RGB signals generated by the Applied Materials, Inc. control system for video activity that indicates a black screen and then gates the horizontal and vertical sync signals. When the horizontal and vertical sync signals are interrupted, the monitor with display power management signaling capability enter into a power saving mode with the screen blanked.

Figure 2:
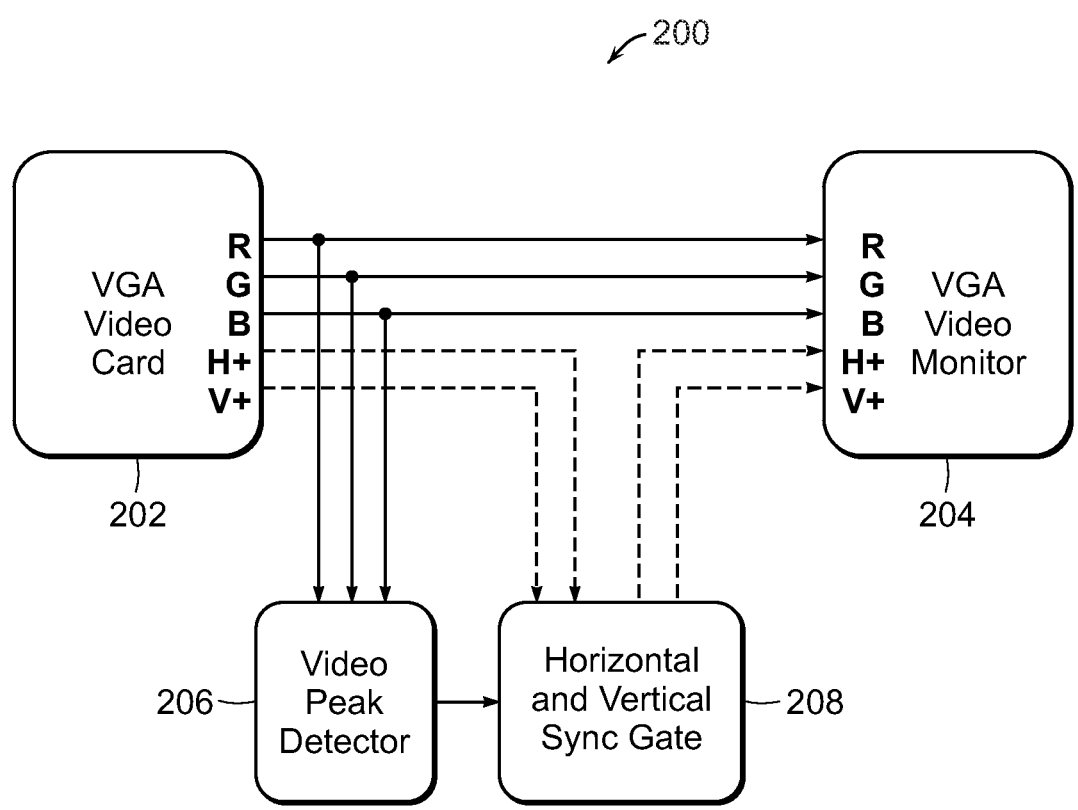
FIG. 2 illustrates a block diagram of the power save electronics according to the present teaching.

FIG. 2 illustrates a block diagram of one embodiment of the power save electronics 200 according to the present teaching. The power save electronics 200 includes a VGA card 202 with standard RGB outputs and vertical and horizontal sync outputs. The RGB outputs of the VGA card 202 are electrically connected to the RGB inputs of a VGA monitor 204. In addition, the RGB outputs of the VGA card 202 are electrically connected to the RGB inputs of a video peak detector 206. One skilled in the art will appreciate that numerous other types of detection methods can be used other than a peak detector. Some examples include monitors for data activity on the RGB lines and digital timing circuits.

In addition, the power save electronics 200 includes a vertical and horizontal synchronous gate 208. The vertical and horizontal sync outputs of the VGA card 202 are electrically connected to inputs of the vertical and horizontal synchronous gate 208. Outputs of the vertical and horizontal synchronous gate 208 are electrically connected to vertical and horizontal sync inputs of the VGA monitor 204.

In operation, the power save electronics 200 emulates display power management signaling by monitoring the data activity of the RGB signals from the controller in the system for video activity that indicates a black (blank) screen or no data activity. If a black screen is detected with the video peak detector 206, the horizontal and vertical sync gate circuit 208 gates the horizontal and vertical sync signals, thereby interrupting the sync signals to the VGA video monitor 204. When the horizontal and vertical sync signals are interrupted, an electrically connected monitor with display power management signaling capability will enter into a power saving mode. When the video peak detector 206 indicates video activity, the horizontal and vertical sync gate circuit 208 passes the horizontal and vertical sync signals to the VGA monitor 204, thereby turning the monitor back on. The operation of the power save electronics 200 can be illustrated by the tables in FIGS. 3A and 3B.

It is important to note that the video peak detector signal can be monitored over a period of time in order to verify that the video lines are truly inactive, and thus calling for activation of the power save circuit. This period of time can be as short as a single refresh cycle of the screen and as long as many minutes, consistent with the power saving requirements. This monitoring requirement is also true for other means of detecting data activity on the video lines.

FIG. 3A illustrates a power saver circuit logic table 300. The table 300 shows that when all the RGB signals are at a zero signal level, the horizontal and vertical sync gate circuit 208 (FIG. 2) passes a horizontal sync output signal, but does not pass a vertical sync signal. In addition, the power saver circuit logic table 300 indicates that when any of the RGB signals are greater than zero, that both the horizontal and the vertical sync output signals are passed by the horizontal and vertical sync gate circuit 208.

FIG. 3B illustrates a display power management signaling table 350. The table 350 illustrates that when both the horizontal and vertical sync signals are received by the monitor 204 (FIG. 2), the monitor 204 is in the "on state." When neither the horizontal nor vertical sync signals are received by the monitor 204, the monitor 204 is either in the "stand by," "suspend" or "off" states.

Figure 4:
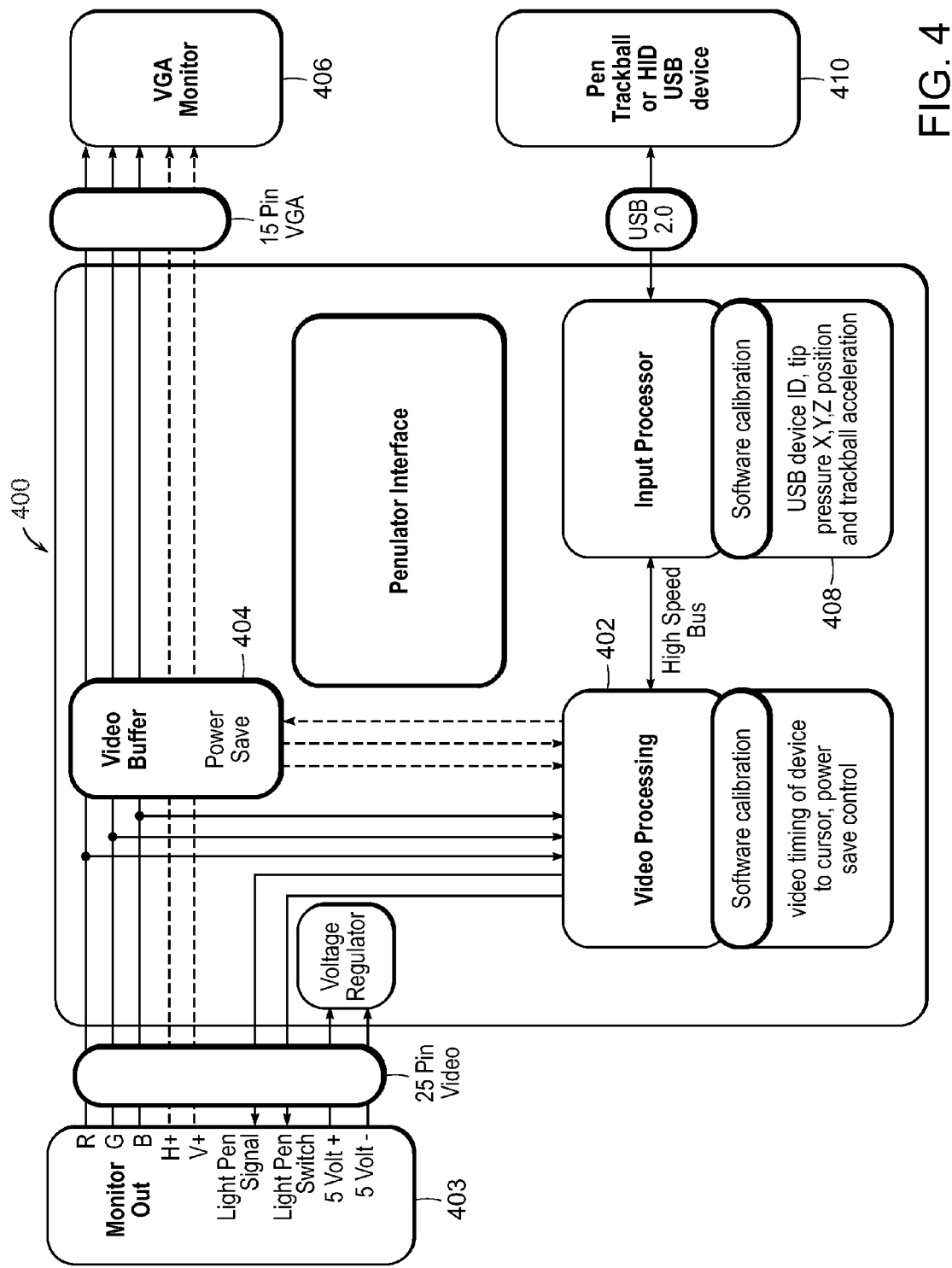
FIG. 4 illustrates a block diagram of a light pen emulator interface that includes the power save circuit according to the present teaching.

FIG. 4 illustrates a block diagram of a light pen emulator interface 400 that includes the power save circuit according to the present teaching. The light pen emulator interface 400 is shown coupled to a 25 pin video output of a system. One skilled in the art will appreciate that the light pen emulator interface 400 can be used with numerous types of systems.

The light pen emulator interface 400 includes a video processor 402 that receives the RGB signals from the system 403. The video processor 402 also transfers light pen data and switching signals to the system. A video buffer 404 has RGB inputs that are electrically connected to the RGB outputs of the system. The video buffer 404 passes the video signals from the system to the VGA monitor 406 when the interface is not in the power save mode. The video processor 402 includes an output that is electrically connected to a control input of the video buffer 404. The video processor 402 includes the video peak detector 206 described in connection with FIG. 2. The video buffer 404 includes the vertical and horizontal sync gate circuit 208 that was described in connection with FIG. 2.

The light pen emulator interface 400 also includes an input processor 408 that interfaces with the video processor 402 through a high-speed interface. The light pen emulator interface 400 also interfaces with an external input device, such as a light pen, trackball or any other human interface device 410 through a USB interface. One skilled in the art will appreciate that other embodiments of the present teaching can use numerous other types of electrical and optical interfaces.

Thus, in some embodiments of the light pen interface of the present teaching, the power save circuit is integrated into the light pen emulation controller. The power save circuit can be used in combination with legacy CRT display systems and also can be used in combination with modern LCD monitors that have minimal warm up time. The light pen emulation controller converts the input data from a touch screen, an electromagnetic pen with digitizing monitor, or a LCD with a mouse or trackball for use on a CRT and light pen control system. The power save circuit works with the same signals. The wake from sleep function can be performed through the emulation controller of a USB input device and then converted into a switch closure.

Another feature of the present teaching is that the CRT light pen interface emulator of the present teaching can include a remote interface that enables remote system control of industrial equipment via the light pen emulating interface over a local network or over the Internet using internet protocol. This feature allows a user to monitor and take control of the industrial equipment remotely within the factory or globally over the Internet with the light pen emulating interface described herein.

The remote interface according to the present teaching is particularly important for legacy semiconductor manufacturing equipment. Presently, there is no way of remotely accessing many versions of legacy semiconductor manufacturing equipment without using expensive system emulators. Many of these prior art emulators are designed to emulate the complete operation of the semiconductor manufacturing equipment and they are too expensive for many end users to implement. One example of such legacy semiconductor manufacturing equipment is semiconductor manufacturing equipment built by Applied Materials, Inc. (Santa Clara, Calif., USA) that is used to process 200 mm and smaller wafer sizes, most of such equipment having been built prior to about 2002. Many thousands of such systems remain in production around the world, and these systems still manufacture a wide variety of critical semiconductor components for a worldwide market place. One estimate is that as many as twenty thousand Applied Materials, Inc. systems in operation today could be greatly enhanced by using the CRT light pen interface with the remote interface according to the present teaching.

Many of these legacy Applied Materials, Inc. systems do include an interface that allows a limited amount of data flow in and out of the equipment, but they do not allow for full access to operator functions. These legacy systems could only be fully accessed directly through the CRT and light pen control system. System access is limited to commands available through the RS232 communication bus within the system architecture. One feature of the remote interface according to the present teaching is that more recent forms of digital interface, such as USB, and USB2.0 can now be directly used with these legacy systems.

Figure 5:
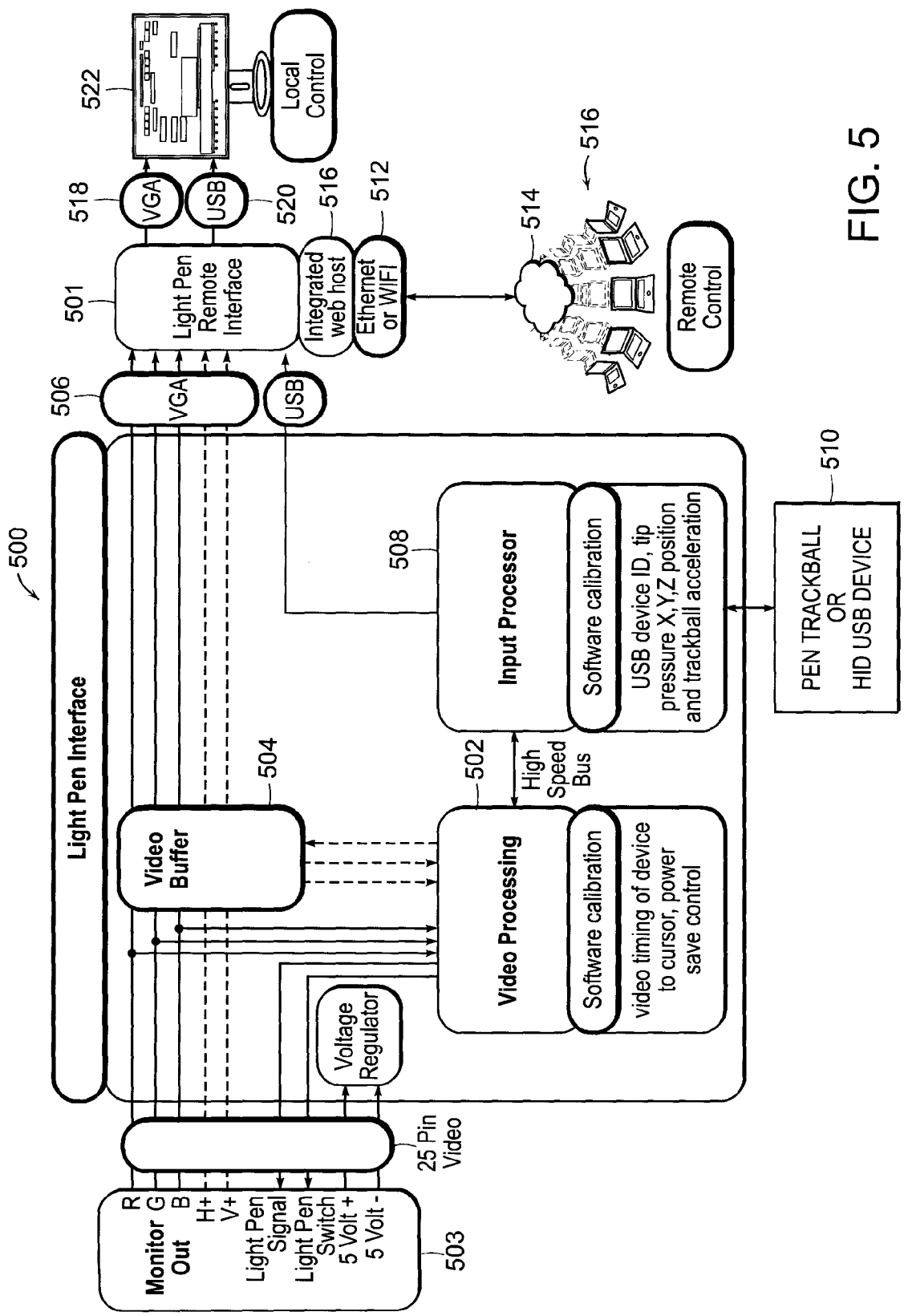
FIG. 5 illustrates a block diagram of a light pen emulator interface that includes a remote interface according to the present teaching.

FIG. 5 illustrates a block diagram of a light pen emulator interface 500 that includes a remote interface 501 according to the present teaching. The light pen emulator interface 500 is shown coupled to a 25 pin video output of a system. One skilled in the art will appreciate that the light pen emulator interface 500 can be used with numerous types of systems.

The light pen emulator interface 500 is similar to the light pen emulator interface 400 that was described in connection with FIG. 4. In many embodiments, the light pen emulator interface 500 includes all the power save features described in connection with the light pen emulator interface 400 described of FIG. 4. The light pen emulator interface 500 includes a video processor 502 that receives the RGB signals from the system 503. The video processor 502 also transfers light pen data and switching signals to the system. A video buffer 504 has RGB inputs that are electrically connected to the RGB outputs of the system. The video buffer 504 passes the video signals from the system to the VGA output 506 when the interface is not in the power save mode. The video processor 502 includes an output that is electrically connected to a control input of the video buffer 504. The video processor 502 includes the video peak detector 206 that is described in connection with FIG. 2. The video buffer 504 includes the vertical and horizontal sync gate circuit 208 that was described in connection with FIG. 2.

The light pen emulator interface 500 also includes an input processor 508 that interfaces with the video processor 502 through a high-speed interface. The light pen emulator interface 500 also interfaces with an external input device 510, such as a light pen, trackball or any other human interface device through a USB or other type of digital or analog interface. One skilled in the art will appreciate that other embodiments of the present teaching can use numerous types of electrical and optical interfaces.

The light pen emulating remote interface 501 is electrically connected to the VGA output 506. In addition, the light pen emulating remote interface 501 is electrically connected to the input processor 508. For example, the light pen emulating remote interface can be electrically connected to the input processor 508 via a universal serial bus or other digital or analog connection.

The light pen emulating remote interface 501 can include an Ethernet or other WIFI interface 512 to connect the light pen emulating remote interface 501 to a network 514, such as a local area network or the Internet. In addition, the light pen emulating remote interface 501 can include software to perform integrated web hosting so that the video signal from the VGA output can be remotely presented via a web browser 516 to the remote computers 516. Furthermore, the light pen emulating remote interface 501 can include a local VGA 518 and USB interface 520 that is coupled to a local computer 522 to allow local monitoring and control functions.

In one specific embodiment, the remote interface 501 is a remote keyboard, video and mouse (KVM) interface, such as the Lantronix Spider® family of remote KVM interfaces. Such remote KVM interfaces provide secure, remote KVM interface functions over internet protocol as well as transparent local access. The remote KVM is configured to interface with the emulating CRT light pen interface of the present teaching and the emulating CRT light pen interface is programmed to communication with the remote KVM. Many remote KVM interfaces, such as the Lantronix Spider® family of remote KVM interfaces, are controllable through a web browser over a local area network (LAN) or wide area network (WAN).

In operation, once the remote interface 501 is connected over the LAN or WAN 514, the emulating CRT light pen interface 500 allows full control of the system, emulating direct live access to the system. The emulating CRT light pen interface of the present teaching transposes control signals from external USB input devices 510, such as digitizers, track balls, mice, or other input device directly to the light pen input of the system. The remote interface 501 enables remote control of the system over the Internet. In addition, the remote interface 501 is used to provide simultaneously access by any user connected to the LAN or WAN. Users can transfer files, perform upgrades, install patches, redirect local drives, and perform full system upgrades by ISO file. Furthermore, the remote interface 501 can include a power control unit that can initiate system reboots over the network and can allow remote switching of access to the equipment from local to remote.

One embodiment of the present teaching uses a light pen switch interface with a switch multiplexer including a KVM unit as described above. A light pen switch interface according to the present teaching continuously or periodically monitors all connected light pen emulators for a light pen switching signal and then switches the input signal to the appropriate monitor.

The light pen switch interface and method of operating according to the present teaching are particularly useful in conjunction with a remote control system that provides for unattended remote switching. By translating a mouse click from the KVM to a light pen input switch closure, the system can switch to the remote input without human interaction at the system. Such remote switching capability is critical to serviceability of many systems. It is highly desirable for systems to communicate trouble and errors to a remote host that can send messages via SMS or E-mail which indicate a trouble condition. With the ability to switch the system control to the web browser based light pen emulator by remote, unattended system trouble shooting and service can be achieved.

Figure 6:
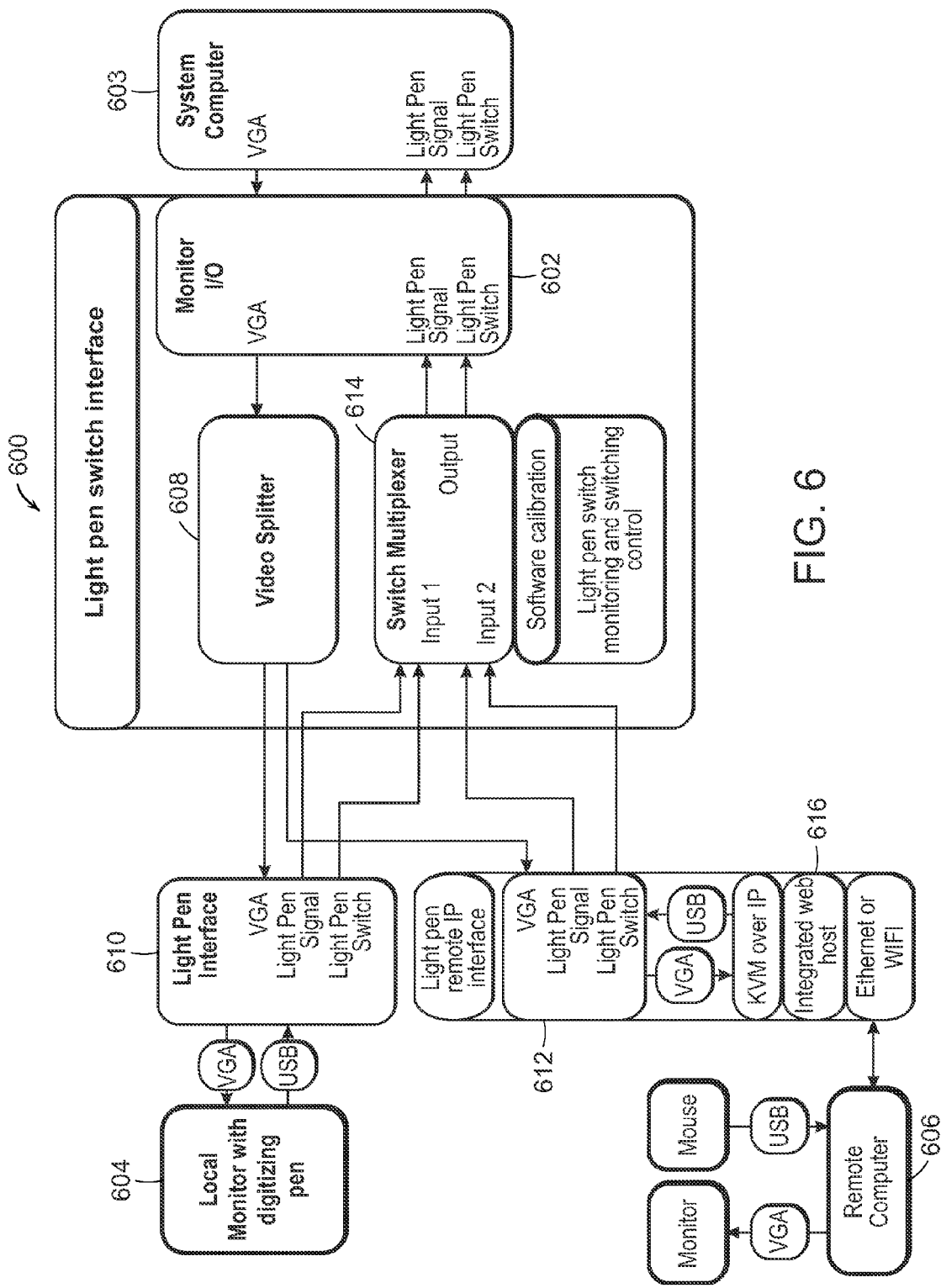
FIG. 6 illustrates a block diagram of a light pen switch interface according to the present teaching.

FIG. 6 illustrates a block diagram of a light pen switch interface 600 according to the present teaching. The light pen switch interface 600 includes a monitor I/O interface 602 for sending video signals from a system computer 603 to be displayed on local monitors 604 and remote computers 606 and for transmitted light pen signals and light pen data to the system computer 603. A video splitter 608 includes an input that is electrically coupled to the video output of the monitor interface 602. The video splitter 608 splits the video signal from the monitor interface 602 into a first signal that is transmitted to a video input of a local light pen interface 610 and a second signal that is transmitted to a video input of a remote light pen interface 612.

The light pen interface 610 includes a local USB interface for receiving data from the local monitor 604. The remote IP interface 612 includes a video input that is coupled to an output of the video splitter 608 and outputs for the light pen signal and the light pen switch data to a switch multiplexer 614. The remote IP interface 612 can also include an integrated web host 616 that is in communication with a wireless network and/or in communication with an Ethernet network. Remote computers 606 can communicate with the light pen switch interface 600 via the remote IP interface 612.

The light pen interface 610 and the remote IP interface 612 transmit the light pen signal and the light pen switch data to a switch multiplexer 614. In some embodiments, the light pen switch interface 600 includes light pen switch monitoring and switching control hardware and software to allow the light pen switch interface 600 to select one of a plurality of system monitors using the light pen, a trackball, or some other type of remote interface. The switching control hardware and software can provide additional functions such as a service lock out feature that prevents access to certain monitors. Such a service lock out feature can provide a visual indication of the locked-out monitor. The switch multiplexer 614 passes the light pen signal and the light pen switch data to the system computer 603 through the monitor I/O interface 602.

In practice, the light pen switch interface 600 allows a user to easily switch between a plurality of local or remote system monitors with input devices and control at least one of the plurality of monitors with the input device. The switching can be accomplished by various means including touching a light pen to a video monitor or activating a pen or a trackball switch for a predetermined time, such as a few seconds. The light pen switch interface of the present teaching has many practical applications. For example, clean rooms for semiconductor manufacturing and other manufacturing facilities include many computer driven tools where the computer monitors need to be manually selected.

The remote interface according to the present teaching is useful for many applications. For example, engineers with portable network ready devices, such as laptops, tablet devices (like the IPad), and smart phones can remotely connect with the emulating CRT light pen interface through the remote interface and then control the operation of the industrial equipment and/or perform diagnostic and troubleshooting operations. More specifically, the remote interface according to the present teaching is particularly useful for offsite troubleshooting. System experts located anywhere around the globe could directly access machines that needs service. Allowing this remote access can greatly decrease system down time by decreasing the service time. Furthermore, allowing this remote access can greatly decrease service cost by allowing a single engineer to work with multiple systems in a single day because travel will not be necessary. In fact, maintenance staff and management can access the machine that needs service immediately from anywhere in the factory or from a remote location anywhere in the world, which can greatly increase system utilization. Engineers can even access multiple machines simultaneously to compare operation and system parameters. The emulating CRT light pen interface can be programmed to automatically notify certain individuals via email or other messaging services of system behavior through the remote interface.

EQUIVALENTS

While the Applicants' teaching is described in conjunction with various embodiments, it is not intended that the Applicants' teaching be limited to such embodiments. On the contrary, the Applicants' teaching encompasses various alternatives, modifications, and equivalents, as will be appreciated by those of skill in the art, which may be made therein without departing from the spirit and scope of the teaching.

What is claimed is:

1. A CRT light pen interface emulator for flat panel displays, the emulator comprising:
   a) a pen flat panel display that indicates at least one of a user action and a presence of a light pen emulating object positioned proximate to a display surface of the pen flat panel display;
   b) a light pen emulating object that is positionable proximate to the pen flat panel display;
   c) a processor that generates a light pen emulation signal at an output, the light pen emulation signal comprising position data for the light pen emulating object relative to the display surface of the flat panel display; and
   d) a light pen CRT electronic interface having an input that is electrically coupled to the output of the processor, the light pen CRT electronic interface converting the position data for the light pen emulating object into a signal that is comparable to a signal generated by a CRT light pen viewing a scanning dot on the CRT screen.

2. The CRT light pen interface of claim 1 wherein the pen flat panel display comprises a flat panel display comprising an electromagnetic pen input device.

3. The CRT light pen interface of claim 1 wherein the pen flat panel display comprises a flat panel display comprising a capacitive pen input device.

4. The CRT light pen interface of claim 1 wherein the pen flat panel display comprises flat panel display comprising an electrostatic pen input device.

5. The CRT light pen interface of claim 1 wherein the pen flat panel display comprises a pen flat panel display comprising a surface acoustic wave input device.

6. The CRT light pen interface of claim 1 wherein the pen flat panel display comprises a flat panel display comprising an infrared bezel input device.

7. The CRT light pen interface of claim 1 wherein the light pen emulating object is passive.

8. The CRT light pen interface of claim 1 wherein the light pen emulating object is active.

9. The CRT light pen interface of claim 1 wherein the flat panel display comprises a LCD display.

10. The CRT light pen interface of claim 1 wherein the flat panel display comprises a plasma display.

11. The CRT light pen interface of claim 1 wherein the flat panel display comprises a OLED display.

12. The CRT light pen interface of claim 1 wherein the at least one user action comprises activating a switch.

13. The CRT light pen interface of claim 1 wherein the light pen emulating object is coupled to the flat panel display by a USB Human Interface Device.

14. The CRT light pen interface of claim 1 wherein the flat panel display generates a signal responsive to a pressure of the light pen emulating object on a surface of the flat panel display.

15. The CRT light pen interface of claim 1 wherein the position data for the light pen emulating object relative to the display surface of the flat panel display comprises a position proximate to or on the flat panel display.

16. The CRT light pen interface of claim 1 wherein the position data for the light pen emulating object relative to the display surface of the flat panel display comprises three-dimensional position data including X, Y, and Z coordinates.

17. The CRT light pen interface of claim 1 wherein the position data for the light pen emulating object relative to the display surface of the flat panel display comprises a pressure on the flat panel display.

18. The CRT light pen interface of claim 1 further comprising a video interface electrically coupled to the light pen CRT electronic interface, the video interface processing the signal that is comparable to the signal generated by a CRT light pen viewing a scanning dot on the CRT screen.

19. The CRT light pen interface of claim 1 further comprising a remote interface that communicates with a network.

20. The CRT light pen interface of claim 19 wherein the network communicates with the Internet.

21. The CRT light pen interface of claim 19 wherein the remote interface comprises a keyboard, video and mouse interface.

22. The CRT light pen interface of claim 1 further comprising a power save device.

23. The CRT light pen interface of claim 22 wherein the power save device comprises a video signal activity detector that generates a video activity detection signal indicating a video condition and a vertical and horizontal sync gate circuit that is responsive to a signal generated by the video signal activity detector, the vertical and horizontal sync gate circuit blanking at least one of the vertical and horizontal sync signals in response to the video activity detection signal.

24. The CRT light pen interface of claim 23 wherein the video condition comprises a black screen condition.

25. The CRT light pen interface of claim 23 wherein the video signal activity detector comprises a video peak detector.

26. The CRT light pen interface of claim 1 further comprising a remote interface that provides automatic notification of system behavior to remote users.

27. The CRT light pen interface of claim 1 further comprising a light pen switch interface that switches between a plurality of system monitors and that provides remote control of at least one of the plurality of system monitors.

28. A method of inputting user data with a flat panel display by emulating a CRT light pen system, the method comprising:
   a) acquiring information comprising position and switch data with a light pen emulating object;
   b) parsing the acquired information to obtain position and switch data for the light pen emulating object;
   c) calibrating the position and switch data with predetermined calibration standards;
   d) converting the calibrated position and switch data into a signal that is comparable to a signal generated by a CRT light pen viewing a scanning dot on the CRT screen; and
   e) transmitting the signal that is comparable to the signal generated by a CRT light pen viewing a scanning dot on the CRT screen to a video processor.

29. The method of claim 28 wherein the switch data comprise pressure data.

30. The method of claim 28 wherein the transmitting the signal that is comparable to the signal generated by a CRT light pen viewing a scanning dot on the CRT screen to the video processor comprises transmitting the signal via a serial link where position, pressure, and switch data is separated in time to allow polling when it is received.

31. The method of claim 30 wherein the polling is used to reduce the need for performing interrupts, thereby improving synchronization.

32. The method of claim 28 wherein the transmitting the signal that is comparable to the signal generated by a CRT light pen viewing a scanning dot on the CRT screen to the video processor is performed using a USART.

33. The method of claim 28 wherein the generating information comprising position and switch data with a light pen is performed at a clock speed used to draw corresponding video pixels.

34. The method of claim 28 further comprising providing a remote interface to allow monitoring and control via a remote network.

35. The method of claim 34 wherein the remote network is in communication with the Internet.

36. The method of claim 28 further comprising selecting one of a plurality of system monitors before acquiring information comprising position and switch data with the light pen emulating object.

37. A method of remotely inputting user data with a flat panel display by emulating a CRT light pen system, the method comprising:
   a) acquiring information comprising position and switch data with an emulating object on the flat panel display;
   b) parsing the acquired information to obtain position and switch data for the emulating object;
   c) calibrating the position and switch data with predetermined calibration standards;
   d) converting the calibrated position and switch data into a corresponding signal that is comparable to a signal generated by a CRT light pen viewing a scanning dot on the CRT screen; and
   e) transmitting the calibrated data to a remote interface.

38. The method of claim 37 further comprising transmitting the remote data through the remote interface to a network.

39. The method of claim 37 wherein the network is connected to the Internet.

40. The method of claim 37 further comprising transmitting automatic notification of system behavior to the network.

41. The method of claim 37 further comprising selecting one of a plurality of system monitors before acquiring information comprising position and switch data with the emulating object.

* * * * *